(12) United States Patent
Papasakellariou (10) Patent No.: US 10,813,107 B2
(45) Date of Patent: *Oct. 20, 2020

(54) OBTAINING CONTROL CHANNEL ELEMENTS OF PHYSICAL DOWNLINK CONTROL CHANNELS FOR CROSS-CARRIER SCHEDULING

(71) Applicant: Samsung Electronics Co., Ltd, Suwon-si, Gyeonggi-do (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 60 days.

This patent is subject to a terminal disclaimer.

(21) Appl. No.: 16/215,223

(22) Filed: Dec. 10, 2018

(65) Prior Publication Data

US 2019/0110303 A1    Apr. 11, 2019

Related U.S. Application Data

(63) Continuation of application No. 14/878,966, filed on Oct. 8, 2015, now Pat. No. 10,165,582, which is a continuation of application No. 13/914,723, filed on Jun. 11, 2013, now Pat. No. 9,158,716.

(60) Provisional application No. 61/748,694, filed on Jan. 3, 2013, provisional application No. 61/754,823, filed on Jan. 21, 2013.

(51) Int. Cl.
| | | |
|---|---|---|
| *H04W 72/12* | (2009.01) | |
| *H04W 72/04* | (2009.01) | |
| *H04W 88/02* | (2009.01) | |
| *H04W 88/08* | (2009.01) | |

(Continued)

(52) U.S. Cl.
CPC ......... *H04W 72/1205* (2013.01); *H04L 5/001* (2013.01); *H04L 5/003* (2013.01); *H04W 72/042* (2013.01); *H04W 72/0453* (2013.01); *H04W 72/1289* (2013.01); *H04W 88/02* (2013.01); *H04W 88/08* (2013.01); *H04L 5/0048* (2013.01); *H04L 5/0053* (2013.01);

(Continued)

(58) Field of Classification Search
CPC ....... H04L 5/001; H04L 5/003; H04L 5/0048; H04L 5/0053; H04W 72/042; H04W 88/02; H04W 72/0453; H04W 88/08; H04W 72/1289; H04W 84/042; H04W 72/1205; H04W 72/1278
USPC ......................................................... 370/329
See application file for complete search history.

(56) References Cited

U.S. PATENT DOCUMENTS

| | | | | |
|---|---|---|---|---|
| 2011/0228724 A1* | 9/2011 | Gaal | ...................... | H04L 5/0094 370/328 |
| 2013/0107809 A1* | 5/2013 | Ko | ...................... | H04W 72/042 370/328 |

(Continued)

OTHER PUBLICATIONS

Korean Intellectual Property Office, Decision to Grant dated Jun. 3, 2020 regarding Application No. 10-2019-0143576, 3 pages.

(Continued)

*Primary Examiner* — Rownak Islam (57) ABSTRACT

A base station (BS) and a user equipment (UE) communicate with each other by the BS transmitting and the UE receiving, via a physical downlink control channel (PDCCH), control channel elements (CCEs) corresponding to a PDCCH candidate obtained based on a carrier index $n_{CI}$.

20 Claims, 8 Drawing Sheets

(51) Int. Cl.
*H04L 5/00* (2006.01)
*H04W 84/04* (2009.01)

(52) U.S. Cl.
CPC ...... *H04W 72/1278* (2013.01); *H04W 84/042* (2013.01)

(56) References Cited

U.S. PATENT DOCUMENTS

| | | | | |
|---|---|---|---|---|
| 2015/0282129 | A1* | 10/2015 | Takeda | H04L 27/2643 370/329 |
| 2015/0327271 | A1* | 11/2015 | Wu | H04W 24/02 370/329 |
| 2017/0150484 | A1* | 5/2017 | Zhu | H04W 72/0486 |
| 2017/0238291 | A1* | 8/2017 | Seo | H04L 5/0039 370/329 |

OTHER PUBLICATIONS

European Patent Office, Communication under Rule 71(3) EPC dated Jun. 4, 2020 regarding Application No. 19184863.9, 7 pages.
LG Electronics, "UE-specific Search Space Offset Details for Cross-Carrier Scheduling", 3GPP TSG RAN WG1 Meeting #62, R1-104754, Aug. 2010, 6 pages.
NTT Docomo, "Further Investigation on UE-Specific Search Space Design for Carrier Aggregation", 3GPP TSG RAN WG1 Meeting #62, R1-104923, Aug. 2010, 7 pages.
Fujitsu, "Discussion on PDCCH CIF Design in Cross Carrier Scheduling", 3GPP TSG RAN WG1 Meeting #62bis, R1-105677, Oct. 2010, 4 pages.
Notice of Reasons for Refusal regarding Japanese Patent Application No. 2019/129429, dated Sep. 7, 2020, 7 pages.

* cited by examiner

OBTAINING CONTROL CHANNEL ELEMENTS OF PHYSICAL DOWNLINK CONTROL CHANNELS FOR CROSS-CARRIER SCHEDULING

CROSS-REFERENCE TO RELATED APPLICATION(S) AND CLAIM OF PRIORITY

This application is a continuation of U.S. Non-Provisional patent application Ser. No. 14/878,966 filed Oct. 8, 2015 and entitled "OBTAINING CONTROL CHANNEL ELEMENTS OF PHYSICAL DOWNLINK CONTROL CHANNELS FOR CROSS-CARRIER SCHEDULING," which is a continuation of U.S. Non-Provisional patent application Ser. No. 13/914,723 filed Jun. 11, 2013 and entitled "OBTAINING CONTROL CHANNEL ELEMENTS OF PHYSICAL DOWNLINK CONTROL CHANNELS FOR CROSS-CARRIER SCHEDULING," now U.S. Pat. No. 9,185,716, and claims priority to U.S. Provisional Patent Application No. 61/754,823 filed Jan. 21, 2013 and entitled "SEARCH PROCESS FOR PHYSICAL DOWNLINK CONTROL CHANNELS FOR CROSS-CARRIER SCHEDULING" and U.S. Provisional Patent Application No. 61/748,694 filed Jan. 3, 2013 and entitled "SEARCH PROCESS FOR PHYSICAL DOWNLINK CONTROL CHANNELS FOR CROSS-CARRIER SCHEDULING." The content of the above-identified patent documents is incorporated herein by reference.

TECHNICAL FIELD

The present application relates generally to wireless communication systems and, more specifically, to transmission and reception of physical downlink control channels.

BACKGROUND

A communication system includes a DownLink (DL) that conveys signals from transmission points such as Base Stations (BSs) or NodeBs to User Equipments (UEs) and an UpLink (UL) that conveys signals from UEs to reception points such as NodeBs. A UE, also commonly referred to as a terminal or a mobile station, may be fixed or mobile and may be a cellular phone, a personal computer device, and the like. A NodeB, which is generally a fixed station, may also be referred to as an access point or other equivalent terminology.

DL signals includes data signals, which carry information content, control signals, and Reference Signals (RS), which are also known as pilot signals. A NodeB conveys data information to UEs through respective Physical Downlink Shared CHannels (PDSCHs) and control information through respective Physical Downlink Control CHannels (PDCCHs). UL signals also include data signals, control signals and RS. UEs convey data information to NodeBs through respective Physical Uplink Shared CHannels (PUSCHs) and control information through respective Physical Uplink Control CHannels (PUCCHs). A UE transmitting data information may also convey control information through a PUSCH.

SUMMARY

A method of a NodeB in communication with a User Equipment (UE) is provided. The NodeB transmits control information scheduling data transmissions to or from UEs via respective Physical Downlink Control CHannels (PDCCHs). A PDCCH is transmitted in a number of Control Channel Elements (CCEs) in physical resources that are uniquely determined from a PDCCH candidate m for a respective carrier with an no index.

A NodeB in communication with a User Equipment (UE) is provided. The NodeB comprises one or more processors configured to transmit Physical Downlink Control CHannels (PDCCHs). A PDCCH is transmitted in a number of Control Channel Elements (CCEs) in physical resources that are uniquely determined from a PDCCH candidate m for a respective carrier with an $n_{CI}$ index.

A User Equipment (UE) in communication with a NodeB is provided. The UE comprises one or more processors configured to receive Physical Downlink Control CHannel (PDCCHs). A PDCCH is transmitted in a number of Control Channel Elements (CCEs) in physical resources that are uniquely determined from a PDCCH candidate m for a respective carrier with an $n_{CI}$ index.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged cellular system.

The following documents and standards descriptions are hereby incorporated into the present disclosure as if fully set forth herein: 3GPP TS 36.211 v10.1.0, "E-UTRA, Physical channels and modulation" (REF 1); 3GPP TS 36.212 v10.1.0, "E-UTRA, Multiplexing and Channel coding" (REF 2); 3GPP TS 36.213 v10.1.0, "E-UTRA, Physical Layer Procedures" (REF 3); and 3GPP TS 36.331 v11.1.0, "E-UTRA, Radio Resource Control (RRC) Protocol Specification." (REF 4).

Figure 1:
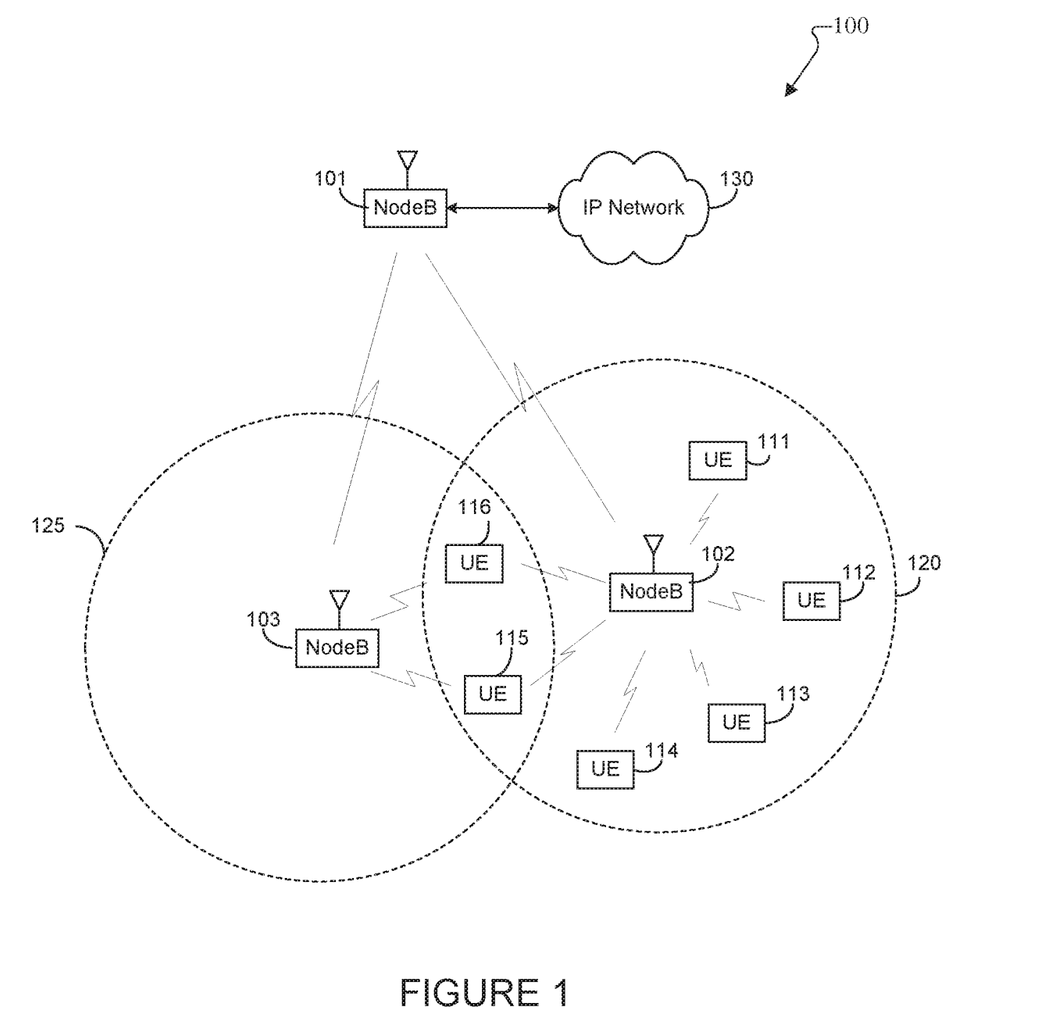
FIG. 1 illustrates a wireless network according to embodiments of the present disclosure.

FIG. 1 illustrates a wireless network 100 according to one embodiment of the present disclosure. The embodiment of wireless network 100 illustrated in FIG. 1 is for illustration only. Other embodiments of wireless network 100 could be used without departing from the scope of this disclosure.

The wireless network 100 includes NodeB 101, NodeB 102, and NodeB 103. NodeB 101 communicates with NodeB 102 and NodeB 103. NodeB 101 also communicates with Internet protocol (IP) network 130, such as the Internet, a proprietary IP network, or other data network.

Depending on the network type, other well-known terms may be used instead of "NodeB", such as "transmission point" (TP), "base station" (BS), "access point" (AP), or "eNodeB" (eNB). For the sake of convenience, the term NodeB shall be used herein to refer to the network infrastructure components that provide wireless access to remote terminals.

For the sake of convenience, the term "user equipment" or "UE" is used herein to designate any remote wireless equipment that wirelessly accesses a NodeB, whether the UE is a mobile device (e.g., cell phone) or is normally considered a stationary device (e.g., desktop personal computer, vending machine, etc.). In other systems, other well-known terms may be used instead of "user equipment", such as "mobile station" (MS), "subscriber station" (SS), "remote terminal" (RT), "wireless terminal" (WT), and the like.

NodeB 102 provides wireless broadband access to network 130 to a first plurality of user equipments (UEs) within coverage area 120 of NodeB 102. The first plurality of UEs includes UE 111, which may be located in a small business; UE 112, which may be located in an enterprise; UE 113, which may be located in a WiFi hotspot; UE 114, which may be located in a first residence; UE 115, which may be located in a second residence; and UE 116, which may be a mobile device, such as a cell phone, a wireless laptop, a wireless PDA, or the like. UEs 111-116 may be any wireless communication device, such as, but not limited to, a mobile phone, mobile PDA and any mobile station (MS).

NodeB 103 provides wireless broadband access to a second plurality of UEs within coverage area 125 of NodeB 103. The second plurality of UEs includes UE 115 and UE 116. In some embodiments, one or more of NodeBs 101-103 can communicate with each other and with UEs 111-116 using LTE or LTE-A techniques including techniques for using control channel elements of PDCCHs as described in embodiments of the present disclosure.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Although FIG. 1 depicts one example of a wireless network 100, various changes may be made to FIG. 1. For example, another type of data network, such as a wired network, may be substituted for wireless network 100. In a wired network, network terminals may replace NodeBs 101-103 and UEs 111-116. Wired connections may replace the wireless connections depicted in FIG. 1.

Figure 2A:
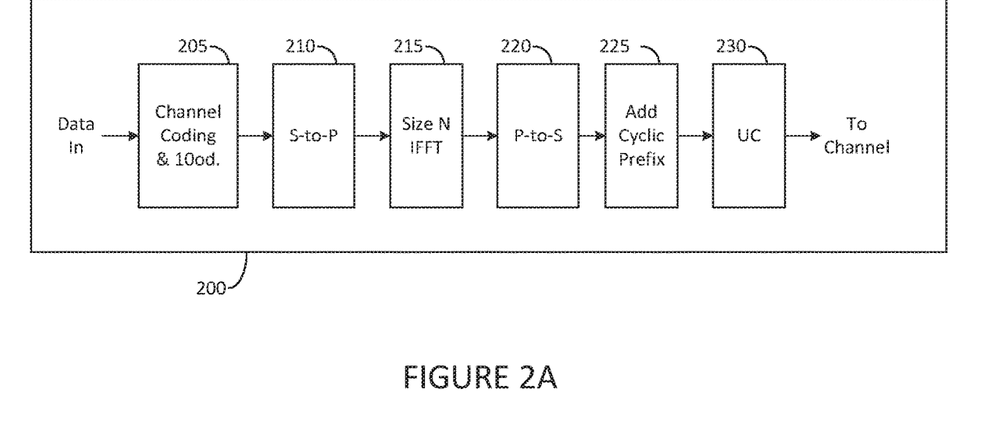
FIG. 2A illustrates a high-level diagram of a wireless transmit path according to embodiments of the present disclosure.
Figure 2B:
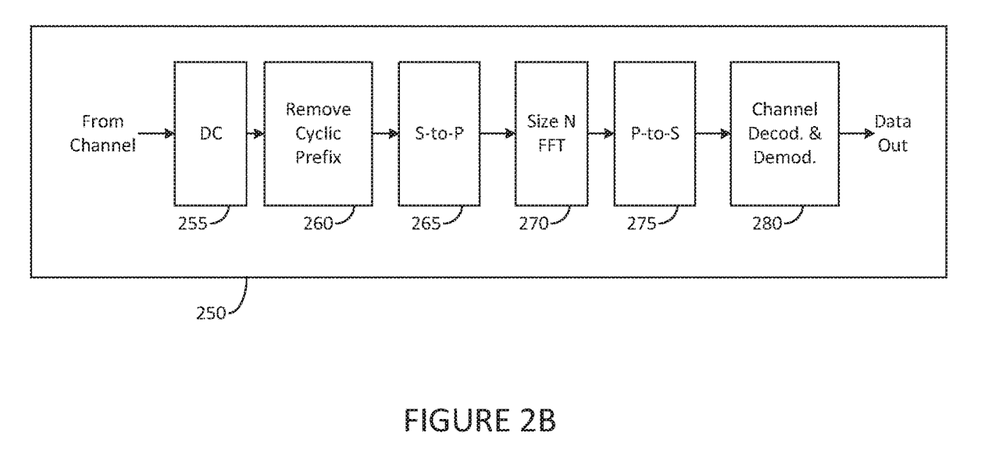
FIG. 2B illustrates a high-level diagram of a wireless receive path according to embodiments of the present disclosure.

FIG. 2A is a high-level diagram of a wireless transmit path. FIG. 2B is a high-level diagram of a wireless receive path. In FIGS. 2A and 2B, the transmit path 200 may be implemented, e.g., in NodeB 102 and the receive path 250 may be implemented, e.g., in a UE, such as UE 116 of FIG. 1. It will be understood, however, that the receive path 250 could be implemented in a NodeB (e.g., NodeB 102 of FIG. 1) and the transmit path 200 could be implemented in a UE. In certain embodiments, transmit path 200 and receive path 250 are configured to perform methods for uplink control channel multiplexing in beamformed cellular systems as described in embodiments of the present disclosure. Each of the eNBs 101-103 can include a processor, or processing circuitry, configured to perform methods for uplink control channel multiplexing in beamformed cellular systems as described in embodiments of the present disclosure.

Transmit path 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, and up-converter (UC) 230. Receive path 250 comprises down-converter (DC) 255, remove cyclic prefix block 260, serial-to-parallel (S-to-P) block 265, Size N Fast Fourier Transform (FFT) block 270, parallel-to-serial (P-to-S) block 275, and channel decoding and demodulation block 280.

At least some of the components in FIGS. 2A and 2B may be implemented in software while other components may be implemented by configurable hardware (e.g., one or more processors) or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in NodeB 102 and UE 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at UE 116 after passing through the wireless channel and reverse operations to those at NodeB 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of NodeBs 101-103 may implement a transmit path that is analogous to transmitting in the downlink to UEs 111-116 and may implement a receive path that is analogous to receiving in the uplink from UEs 111-116. Similarly, each one of UEs 111-116 may implement a transmit path corresponding to the architecture for transmitting in the uplink to NodeBs 101-103 and may implement a receive path corresponding to the architecture for receiving in the downlink from NodeBs 101-103. Each of the eNBs 101-103 can include processing circuitry configured to allocate resources to one or more UE's 111-116. For example eNB 102 can include allocator processing circuitry configured to allocate a unique carrier indicator to UE 116.

Figure 3:
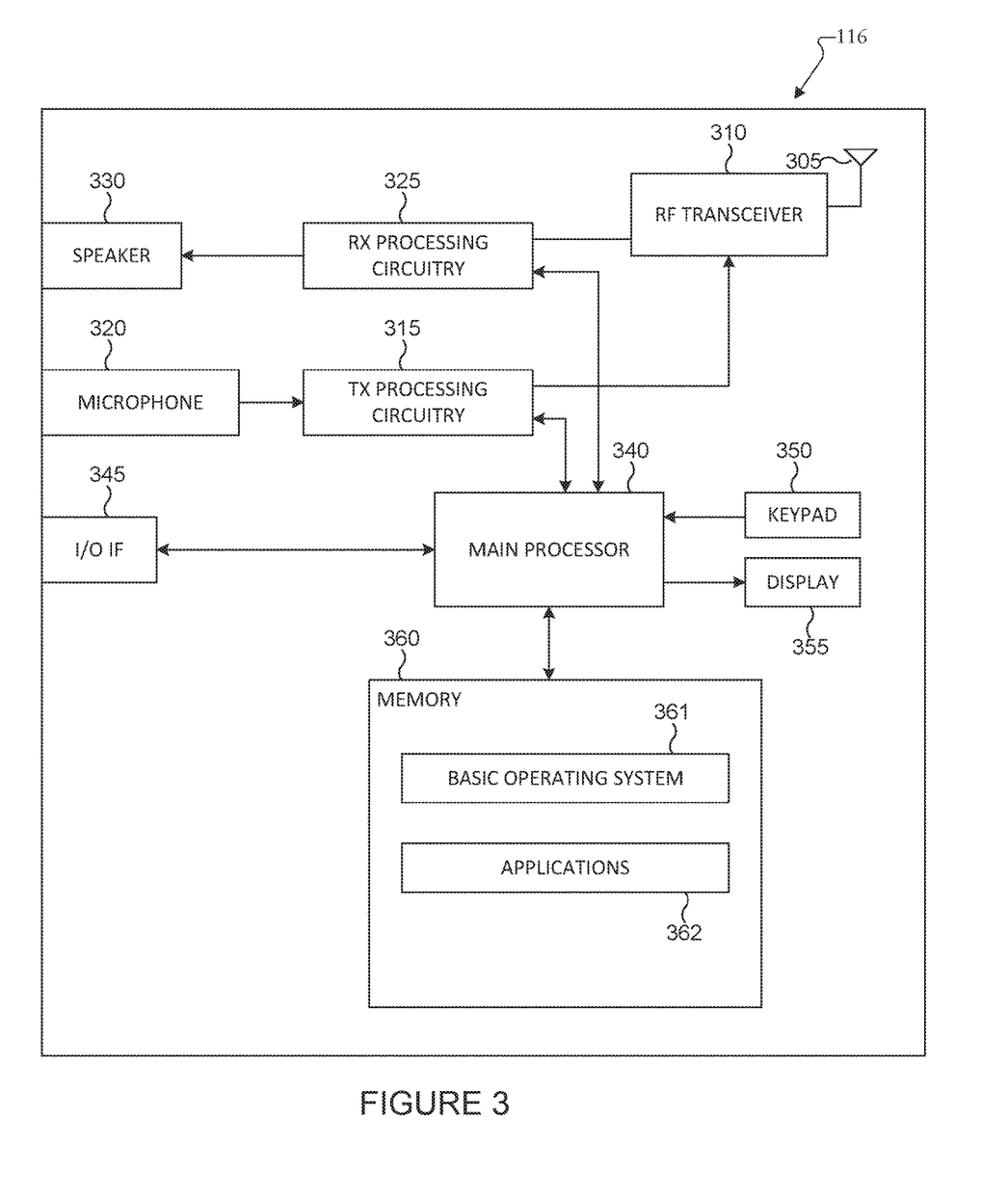
FIG. 3 illustrates a user equipment according to embodiments of the present disclosure.

FIG. 3 illustrates a UE according to embodiments of the present disclosure. The embodiment of user equipment, such as UE 116, illustrated in FIG. 3 is for illustration only. Other embodiments of the wireless subscriber station could be used without departing from the scope of this disclosure. Although MS 116 is depicted by way of example, the description of FIG. 3 can apply equally to any of UE 111, UE 112, UE 113, UE 114 and UE 115.

UE 116 comprises antenna 305, radio frequency (RF) transceiver 310, transmit (TX) processing circuitry 315, microphone 320, and receive (RX) processing circuitry 325. UE 116 also comprises speaker 330, main processor 340, input/output (I/O) interface (IF) 345, keypad 350, display 355, and memory 360. Memory 360 further comprises basic operating system (OS) program 361 and a plurality of applications 362.

Radio frequency (RF) transceiver 310 receives from antenna 305 an incoming RF signal transmitted by a NodeB of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In certain embodiments, main processor 340 is a microprocessor or microcontroller. Memory 360 is coupled to main processor 340. According to some embodiments of the present disclosure, part of memory 360 comprises a random access memory (RAM) and another part of memory 360 comprises a Flash memory, which acts as a read-only memory (ROM).

Main processor 340 can be comprised of one or more processors and executes basic operating system (OS) program 361 stored in memory 360 in order to control the overall operation of wireless subscriber station 116. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles. Main processor 340 can include processing circuitry configured to allocate one or more resources. For example Main processor 340 can include allocator processing circuitry configured to allocate a unique carrier indicator and detector processing circuitry configured to detect a PDCCH scheduling a PDSCH reception of a PUSCH transmission in one of the C carriers.

Main processor 340 is capable of executing other processes and programs resident in memory 360, such as operations for uplink control channel multiplexing in beamformed cellular systems as described in embodiments of the present disclosure. Main processor 340 can move data into or out of memory 360, as required by an executing process. In some embodiments, the main processor 340 is configured to execute a plurality of applications 362, such as applications for MU-MIMO communications, including obtaining control channel elements of PDCCHs. Main processor 340 can operate the plurality of applications 362 based on OS program 361 or in response to a signal received from BS 102. Main processor 340 is also coupled to I/O interface 345.

I/O interface 345 provides subscriber station 116 with the ability to connect to other devices such as laptop computers and handheld computers. I/O interface 345 is the communication path between these accessories and main controller 340.

Main processor 340 is also coupled to keypad 350 and display unit 355. The operator of subscriber station 116 uses keypad 350 to enter data into subscriber station 116. Display 355 may be a liquid crystal display capable of rendering text and/or at least limited graphics from web sites. Alternate embodiments may use other types of displays.

Downlink Control Information (DCI) serves several purposes and is conveyed through DCI formats in respective PDCCHs. For example, a DCI format may correspond to a DL Scheduling Assignment (SA) for PDSCH receptions or to an UL SA for PUSCH transmissions.

Figure 4:
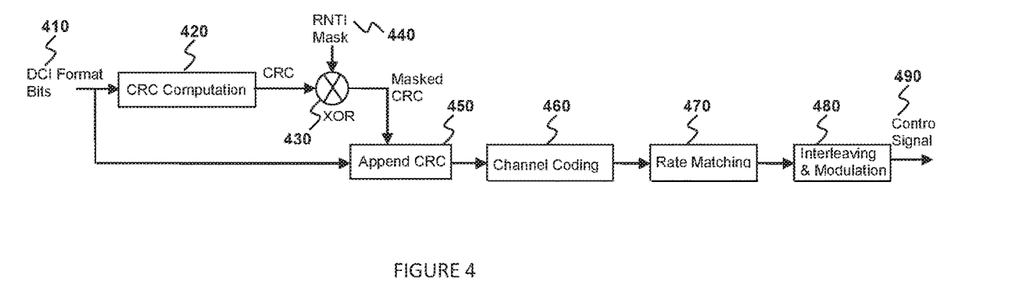
FIG. 4 illustrates an encoding process for a DCI format according to embodiments of the present disclosure.

FIG. 4 illustrates an encoding process for a DCI format according to embodiments of the present disclosure. The embodiment illustrated in FIG. 4 is for illustration only. Other embodiments of could be used without departing from the scope of this disclosure.

A NodeB, such as NodeB 102, separately codes and transmits each DCI format in a respective PDCCH. A Radio Network Temporary Identifier (RNTI) for a UE, such as UE 116, for which a DCI format is intended for, masks a Cyclic Redundancy Check (CRC) of a DCI format codeword in order to enable UE 116 to identify that a particular DCI format is intended for UE 116. The CRC of (non-coded) DCI format bits 410 is computed using a CRC computation operation 420, and the CRC is then masked using an exclusive OR (XOR) operation 430 between CRC and RNTI bits 440. The XOR operation 430 is defined as: XOR(0,0)=0, XOR(0,1)=1, XOR(1,0)=1, XOR(1,1)=0. The masked CRC bits are appended to DCI format information bits using a CRC append operation 450, channel coding is performed using a channel coding operation 460 (e.g. an operation using a convolutional code), followed by rate matching operation 470 applied to allocated resources, and finally, an interleaving and a modulation 480 operation are performed, and the output control signal 490 is transmitted. In the present example, both a CRC and a RNTI include 16 bits.

Figure 5:
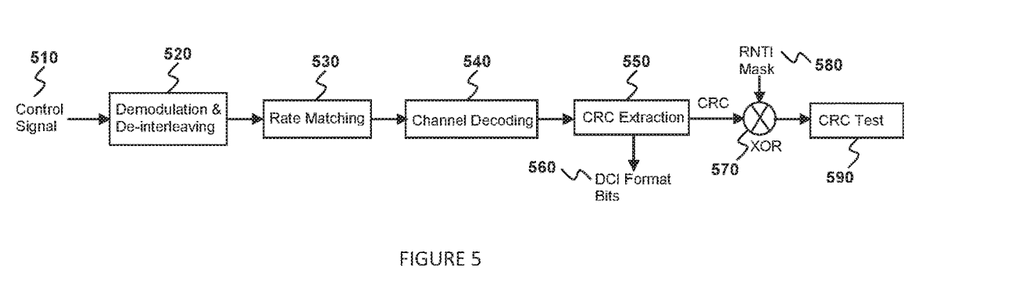
FIG. 5 illustrates a decoding process for a DCI format according to embodiments of the present disclosure.

FIG. 5 illustrates a decoding process for a DCI format according to embodiments of the present disclosure. The embodiment illustrated in FIG. 5 is for illustration only. Other embodiments of could be used without departing from the scope of this disclosure.

A receiver of a UE, such as UE 116, performs the reverse operations of a transmitter of a NodeB, such as NodeB 102, to determine whether the UE has a DCI format assignment in a DL subframe. A received control signal 510 is demodulated and the resulting bits are de-interleaved at operation 520, a rate matching applied at a transmitter of NodeB 102 is restored through operation 530, and data is subsequently decoded at operation 540. After decoding the data, DCI format information bits 560 are obtained after extracting CRC bits 550, which are then de-masked 570 by applying the XOR operation with RNTI 580 of UE 116. Finally, UE 116 performs a CRC test 590. If the CRC test passes, UE 116 determines that a DCI format corresponding to the received control signal 210 is valid and determines parameters for signal reception or signal transmission. If the CRC test does not pass, UE 116 disregards the presumed DCI format.

Embodiments of the present disclosure assume that Orthogonal Frequency Division Multiplexing (OFDM) is used for DL signal transmissions and that a NodeB multiplexes PDSCHs and PDCCHs in the frequency domain over a DL Transmission Time Interval (TTI) which is referred to as a DL subframe. The multiplexing unit is a Physical Resource Block (PRB) that comprises one Resource Block (RB) in the frequency domain and one DL subframe in the time domain. A RB includes a number of $N_{sc}^{RB}$ sub-carriers, or Resource Elements (REs). A DL subframe includes a number of $N_{symb}^{DL}$ OFDM symbols.

Figure 6:
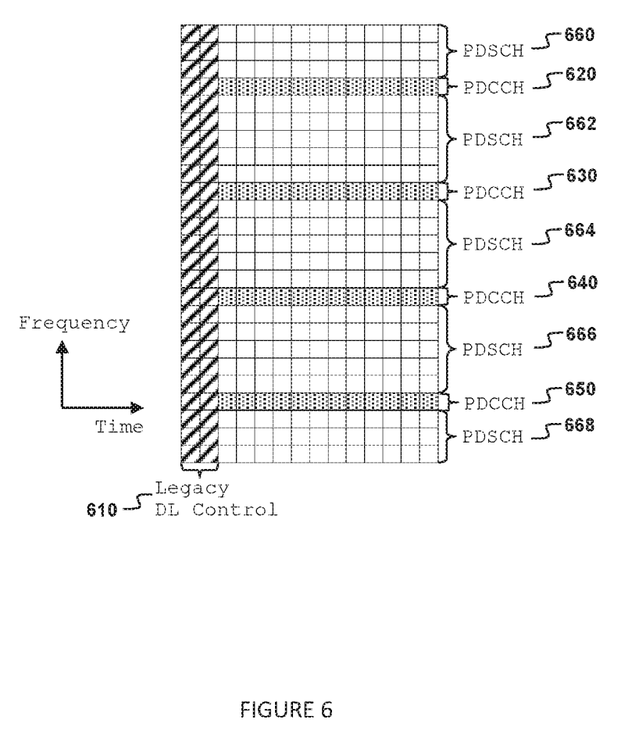
FIG. 6 illustrates multiplexing of transmissions for PDCCHs and PDSCHs over a DL subframe according to embodiments of the present disclosure.

FIG. 6 illustrates multiplexing of transmissions for PDCCHs and PDSCHs over a DL subframe according to embodiments of the present disclosure. The embodiment illustrated in FIG. 6 is for illustration only. Other embodiments of could be used without departing from the scope of this disclosure.

Transmissions of PDCCHs and PDSCHs start after a legacy control region 610, that includes $M_{symb}^{DL}$ OFDM symbols ($M_{symb}^{DL}$ can be zero) 610, and are over $N_{symb}^{DL} - M_{symb}^{DL}$ OFDM symbols of a DL subframe. PDCCH transmissions can occur in four PRBs, 620, 630, 640, and 650, while remaining PRBs 660, 662, 664, 666, 668 can be used for PDSCH transmissions. As a PDCCH transmission can require fewer REs than the number of REs available in a PRB, multiple PDCCHs may be multiplexed in a same PRB.

Multiplexing PDCCHs is by using different Control Channel Elements (CCEs). A CCE defines a PDCCH resource unit and includes a number of Resource Element Groups (REGs). Each REG includes a number of elements. The elements of REGs can be interleaved and then mapped to respective REs in a PRB in a frequency-first manner.

Figure 7:
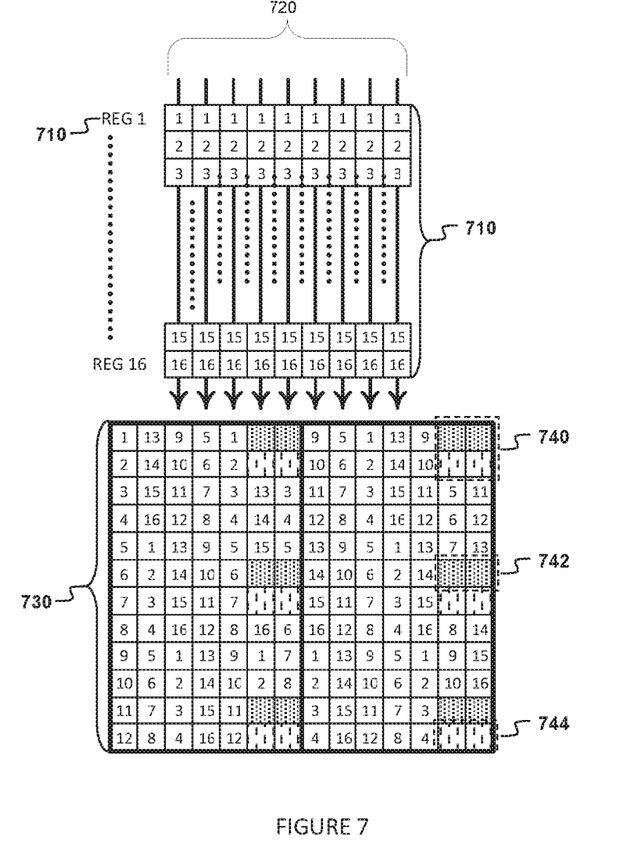
FIG. 7 illustrates mapping of REGs to REs in a PRB according to embodiments of the present disclosure.

FIG. 7 illustrates mapping of REGs to REs in a PRB according to embodiments of the present disclosure. The embodiment illustrated in FIG. 7 is for illustration only. Other embodiments of could be used without departing from the scope of this disclosure.

There are 16 REGs 710, and each REG includes nine elements 720. The elements of REGs are interleaved and mapped to REs of a PRB 730. A PRB further includes REs used to transmit Reference Signals (RSs) 740 for UEs to obtain respective channel estimates and demodulate control information conveyed by respective PDCCHs. Such RSs are referred to as DeModulation RSs (DMRSs). There can be up to four DMRSs transmitted from four respective Antenna Ports (APs) of NodeB 102. The two DMRS REs located in a same frequency position and in successive OFDM symbols, 742 and 744, are multiplexed by applying the Orthogonal Covering Codes (OCCs) of $\{1, 1\}$ and $\{1, -1\}$. Therefore, in REs 742, a first AP of NodeB 102 transmits a first DMRS by applying the $\{1, 1\}$ OCC and a second AP of NodeB 102 transmits a second DMRS by applying the $\{1, -1\}$ OCC. A receiver of UE 116 can obtain a channel estimate from a DMRS AP by removing a respective OCC at respective REs. A CCE can include four REGs, such as for example every fourth REG, and a PRB includes four CCEs.

UE 116 can be configured by NodeB 102 through higher layer signaling, such as Radio Resource Control (RRC) signaling, for multiple sets of PRBs for PDCCH transmissions. For example, UE 116 can be configured for PDCCH transmissions of a first set of 8 PRBs and a second set of 4 PRBs. A PDCCH transmission occurs in one or more PRBs of a same set of PRBs. A PDCCH transmission to UE 116 can be in a single PRB, and it is then referred to as localized and if NodeB 102 has accurate information for a channel experienced by UE 116 then Frequency Domain Scheduling (FDS) or beam-forming can be used. Alternatively, a PDCCH transmission can be in multiple PRBs and it is then referred to as distributed.

To avoid a PDCCH transmission to a UE that is blocking a PDCCH transmission to another UE, a location of each PDCCH in a PRB set is not unique. Therefore, UE 116 performs multiple decoding operations within each configured PRB set to potentially detect PDCCHs in a DL subframe. For a given number of DCI format bits in FIG. 4, a number of CCEs for a respective PDCCH depends on a channel coding rate (Quadrature Phase Shift Keying (QPSK) is assumed as the modulation scheme). NodeB 102 may use a lower channel coding rate (i.e., more CCEs) to transmit PDCCHs to UE 116 while experiencing a low DL Signal-to-Interference and Noise Ratio (SINR) as compared to when UE 116 is experiencing a high DL SINR.

For a PDCCH decoding process, UE 116 can determine candidate PDCCHs according to a function having UE-common parameters as inputs, such as a DL subframe number or a total number of CCEs in a DL subframe, and UE-specific parameters such as a RNTI. For example, CCEs corresponding to PDCCH candidate m can be obtained as in Equation (1) CCEs for PDCCH candidate m in PRB set p:

$$L \cdot \left\{ \left( Y_{p,k} + \left\lfloor \frac{m \cdot N_{CCE,p,k}}{L \cdot M_p^{(L)}} \right\rfloor \right) \bmod \left\lfloor \frac{N_{CCE,p,k}}{L} \right\rfloor \right\} + i \qquad (1)$$

In Equation (1), $N_{CCE,p,k}$ is a total number of CCEs in PRB set p and DL subframe k, L is an aggregation level of CCEs, $i=0, \ldots, L-1$, $m=0, \ldots, M_p^{(L)}-1$, $M_p^{(L)}$ is a number of PDCCH candidates for aggregation level L CCEs in PRB set p and $\lfloor \; \rfloor$ is the "floor" function rounding a number to its lower integer. For example, for a set p of 8 PRBs and 4 CCEs per PRB in DL subframe k, $N_{CCE,p,k}=32$, $L \in \{1,2,4,8,16\}$ and, for respective value of L, $M_p^{(L)} \in \{6,6,2,2,0\}$ or $M_p^{(L)} \in \{0,6,6,2,2\}$ depending on a DCI format UE 116 attempts to detect. Finally, $Y_{p,k}$ randomizes an initial CCE for a first PDCCH candidate in PRB set p for a UE and $Y_{p,k}=(A_p \cdot Y_{p,k-1}) \bmod D_p$ with $Y_{p,-1}=RNTI+f_1(p) \neq 0$, $A_p=39827+f_2(p)$ and $D_p=65537+f_3(p)$ where $f_1(j)$, $f_2(p)$ and $f_3(p)$ are functions of PRB set p. For example, $f_1(0)=f_2(0)=f_3(0)=0$, $f_1(1)=f_3(1)=0$ and $f_2(1)=2$. Unless otherwise mentioned, the RNTI is assumed to be a Cell-RNTI (C-RNTI) assigned to a UE by a base station for PDSCH receptions or PUSCH transmissions scheduled by respective PDCCHs.

In addition to determining CCEs for PDCCH candidates, for localized PDCCH transmissions UE 116 needs to also determine a DMRS AP associated with a respective PDCCH candidate. In order to allow spatial multiplexing of PDCCHs to different UEs in a same set of CCEs, different DMRS APs need to be associated with each such PDCCH transmission. This is achieved by deriving the DMRS AP as a function of a RNTI of UE 116. Moreover, as a number of RNTIs can be much larger than a number of DMRS APs, a DMRS AP can be additionally determined as a function of an initial CCE for a PDCCH transmission to further increase the flexibility for spatial multiplexing. For example, DMRS AP $u=0, \ldots, U-1$, here U is a total number of DMRS APs, can be determined as in Equation (2):

$$u = n_{CCE,init} \bmod N_{CCE,k}^{PRB} + RNTI \cdot \bmod \min(N_{CCE,k}^{PRB}, L) \qquad (2)$$

In Equation (2), mod is the modulo operation, $n_{CCE,init}$ is an initial CCE of a detected PDCCH, $N_{CCE,k}^{PRB}$ is a total number of CCEs in a PRB in DL subframe k, and L is a CCE aggregation level of a detected PDCCH. For example, for $n_{CCE,init}=0$, $N_{CCE,k}^{PRB}=4$, and $L=2$, UEs with even RNTIs use DMRS AP $u=0$ while UEs with odd RNTIs use DMRS AP $u=1$.

In order to improve utilization of carriers with small BandWidths (BWs) or facilitate communication over different carrier frequencies, a communication system can include an aggregation of several carriers. This is referred to as carrier aggregation. For example, one carrier can have a BW of 10 MHz while another carrier may have a DL BW of 1.4 MHz or one carrier may operate at a frequency of 900 MHz while another carrier may operate at a frequency of 2.6 GHz. Then, as a spectral efficiency of PDCCH transmissions is typically low in small DL BWs, it can be preferable to schedule a PDSCH in a carrier with DL BW of 1.4 MHz from a carrier with DL BW of 10 MHz. Also, as a path-loss is larger for higher carrier frequencies and PDCCH typically requires higher detection reliability than PDSCH and cannot benefit from retransmissions, it can be preferable to schedule a PDSCH in a 2.6 GHz carrier from a 900 MHz carrier. A scheduling of PDSCH (or PUSCH) transmissions from one carrier in another carrier is referred to as cross-carrier scheduling.

When NodeB 102 configures cross-carrier scheduling to UE 116, respective DCI formats include a Carrier Indicator Field (CIF) having a value corresponding to a respective carrier. For example, for a CIF consisting of 3 bits and a UE configured with 5 carriers, respective binary CIF values can be '000', '001', '010', '011', and '100' which correspond to respective numeric values $n_{CI}$ of 0, 1, 2, 3, and 4. An approach to determining a PDCCH candidate for a carrier in case of cross-carrier scheduling is to replace m in Equation (1) with $m'=M_p^{(L)} \cdot n_{CI}$. However, in case of Equation (1), due to the modulo operation this results to CCEs for a PDCCH candidate intended for a first carrier overlapping with CCEs for a PDCCH candidate intended for a second carrier.

If same PRB sets are used for PDCCH transmissions with and without cross-carrier scheduling, the likelihood that PDCCH transmissions will overlap in the former case is increased as a larger number of PDCCHs need to be accommodated over a same number of CCEs. To alleviate an impact of such collisions, particularly for the larger CCE aggregation levels, NodeB 102 can apply spatial multiplexing to respective PDCCH transmissions.

Certain embodiments of the present disclosure define candidate PDCCHs in support of cross-carrier scheduling. Certain embodiments of the present disclosure define a different initial CCE for a first PDCCH candidate to a same UE in different PRB sets. Certain embodiments of the present disclosure use spatial multiplexing of PDCCHs to a same UE in support of cross-carrier scheduling.

Certain embodiments of the present disclosure consider a determination by UE 116 of PDCCH candidates associated with different carriers when a same PDCCH PRB set is used in a carrier to perform cross-carrier scheduling in C>1 active carriers. UE 116 configured with C>1 active carriers can determine a search space for candidate PDCCHs according to a same pseudo-random function as in Equation (1) modified to support C>1 active carriers as in Equation (3)

CCEs for PDCCH candidate m in PRB set p:

$$L \cdot \left\{ \left( Y_{p,k} + \left\lfloor \frac{m \cdot N_{CCE,p,k}}{L \cdot \sum_{c=0}^{C-1} M_{p,c}^{(L)}} \right\rfloor \right) \bmod \left\lfloor \frac{N_{CCE,p,k}}{L} \right\rfloor \right\} + i \qquad (3)$$

The parameters in Equation (3) are as defined in Equation (1) with the exception that, for an aggregation level of L CCEs, a total number of PDCCH candidates $$\sum_{c=0}^{C-1} M_{p,c}^{(L)}$$

is considered for all active carriers c=0, . . . ,C−1.

For example, a reason for a number of PDCCH candidates for aggregation level L CCEs in PRB set p to depend on a carrier intended for a respective DL SA or UL SA is that different carriers can have different bandwidths and, for a given DCI format, a number of PDCCH candidates for aggregation level L CCEs in PRB set p can depend on a size of a DCI format which in turn can depend on a respective carrier bandwidth. For example, if a PDCCH transmission in a 20 MHz carrier schedules a PDSCH reception if the 20 MHz carrier or in a 1.4 MHz carrier then, for an aggregation level of L=2 CCE, it have can four candidates for scheduling in the 20 MHz carrier and two candidates for scheduling at the 1.4 MHz carrier. Therefore, in Equation (3), m also depends on the particular carrier.

Equation (3) represents a general case where, for different carriers, a number of PDCCH candidates can be different for a same CCE aggregation level. Otherwise, if for a same CCE aggregation level, a same number of PDCCH candidates exists for different carriers ($M_{p,c}^{(L)}=M_p^{(L)}$ for all c=0, . . . ,C−1), Equation (3) can be simplified as in Equation (4)

CCEs for PDCCH candidate m in PRB set p:

$$L \cdot \left\{ \left( Y_{p,k} + \left\lfloor \frac{m \cdot N_{CCE,p,k}}{L \cdot C \cdot M_p^{(L)}} \right\rfloor \right) \bmod \left\lfloor \frac{N_{CCE,p,k}}{L} \right\rfloor \right\} + i \quad (4)$$

In addition to defining a unified search space encompassing C>1 active carriers, PDCCH candidates for each of the C active carriers need to be defined. For localized PDCCH, it is desirable that PDCCH candidates are distributed in as many PRBs in a set as possible in order to maximize opportunities for a NodeB to perform FDS or beam-forming for a PDCCH transmission. In order to maintain this property in case of cross-carrier scheduling, for every CCE aggregation level, a distribution of PDCCH candidates in a unified search space to each of the C active carriers needs to follow a pattern that allocates every C-th PDCCH candidate to a respective active carrier in the order of a carrier index. For example, for C=2 active carriers and PDCCH candidates determined as in Equation (4), PDCCH candidates m=0,2,4, . . . ,2$M_p^{(L)}$−2 correspond to a first carrier while PDCCH candidates m=1,3,5, . . . ,2$M_p^{(L)}$−1 correspond to a second carrier.

To further illustrate the need for the above allocation pattern, an example with C=2, $Y_{p,k}$=0, L=2, $M_p^{(L)}$=6, and $N_{CCE,p,k}$=32 is considered for an PDCCH PRB set with 8 PRBs and $N_{CCE,k}^{PRB}$=4 (for simplicity, it is assumed that $M_{p,c}^{(L)}=M_p^{(L)}$=6 for c=0,1). For localized PDCCH transmissions, an allocation of CCEs to successive respective PDCCH candidates m=0, . . . 11 is {(0, 1), (2, 3), (4, 5), (8, 9), (10, 11), (12, 13), (16, 17), (18, 19), (20, 21), (24, 25), (26, 27), (28, 29)} and the respective PRBs are {0, 0, 1, 2, 2, 3, 4, 4, 5, 6, 6, 7}. If the first 6 PDCCH candidates were allocated to the first carrier and the last 6 PDCCH candidates were allocated to the second carrier, a consequence would be that PRBs {4, 5, 6, 7} would not have any PDCCH candidate for the first carrier and PRBs {0, 1, 2, 3} would not have any PDCCH candidate for the second carrier while some PRBs have multiple (two) PDCCH candidates for a same carrier. This would then unnecessarily limit FDS and beamforming opportunities for a localized PDCCH transmission due to a respective limitation of PRBs with a respective PDCCH candidate. Conversely, by alternating an allocation of PDCCH candidates to the C=2 active carriers, a PDCCH candidate for the first carrier exists in PRBs {0, 1, 2, 4, 5, 6} and an PDCCH candidate for the second carrier exists in PRBs {0, 2, 3, 4, 6, 7}. Therefore, all PDCCH candidates for each carrier are allocated in different PRBs.

Figure 8:
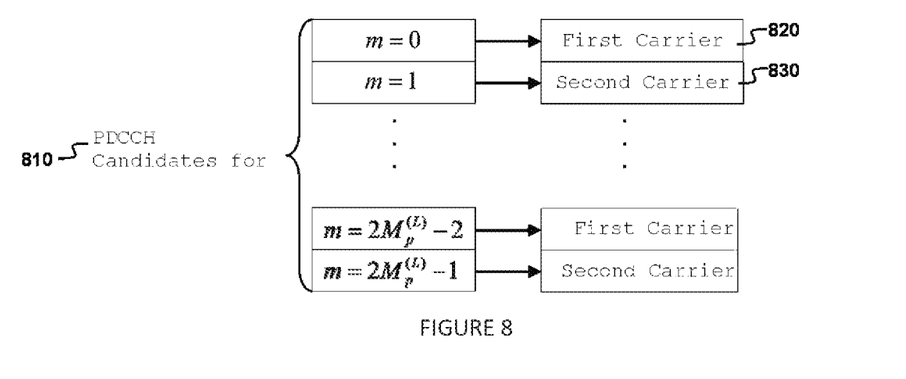
FIG. 8 illustrates an allocation of PDCCH candidates to different active carriers when respective transmissions are in a same set of PRBs according to embodiments of the present disclosure.

FIG. 8 illustrates an allocation of PDCCH candidates to different active carriers when respective transmissions are in a same set of PRBs according to embodiments of the present disclosure. The embodiment illustrated in FIG. 8 is for illustration only. Other embodiments of could be used without departing from the scope of this disclosure.

UE 116 has C=2 active carriers and $M_p^{(L)}$ PDCCH candidates per carrier for CCE aggregation level L in PDCCH PRB set p. UE 116 computes, according to Equation (4), a number of 2$M_p^{(L)}$−1 PDCCH candidates for the C=2 active carriers 810 where the even numbered candidates correspond to the first carrier 820 and the odd numbered carriers correspond to the second carrier 830.

Although the previous example for an alternating association of PDCCH candidates obtained by Equation (3) or Equation (4) to respective carriers considered a respective same number of PDCCH candidates for a CCE aggregation level, it also applies for a different number of PDCCH candidates for a CCE aggregation level. For example, if for an aggregation level of L=2 CCEs, there are $M_{p,0}^{(L)}$=6 PDCCH candidates for a first carrier and $M_{p,0}^{(L)}$=4 PDCCH candidates for a second carrier then, for localized PDCCH transmissions, an allocation of CCEs to successive respective PDCCH candidates m=0, . . . , 9 is {(0, 1), (2, 3), (6, 7), (8, 9), (12, 13), (16, 17), (18, 19), (23, 23), (24, 25), (28, 29)} and the respective PRBs are {0, 0, 1, 2, 3, 4, 4, 5, 6, 7}. Then, PRBs for PDCCH candidates to a first carrier are {0, 1, 3, 4, 6, 7} and PRBs for PDCCH candidates to a first carrier are {0, 2, 4, 5}.

Considering Equation (3) and the alternating assignment of consecutive candidates to different carriers as previously described, the above partitioning of the PDCCH candidates can be expressed as in Equation (3A)

CCEs for PDCCH candidate $m_{n_{CI}}$ in PRB set p for carrier with index $n_{CI}$:

$$L \cdot \left\{ \left( Y_{p,k} + \left\lfloor \frac{m_{n_{CI}} \cdot N_{CCE,p,k}}{L \cdot \max_{n_{CI}}(M_{p,n_{CI}}^{(L)})} \right\rfloor + n_{CI} \right) \bmod \left\lfloor \frac{N_{CCE,p,k}}{L} \right\rfloor \right\} + i \quad (3A)$$

where $m_{n_{CI}}$=0, . . . , $M_{p,n_{CI}}^{(L)}$−1 is a number of PDCCH candidates for aggregation level L CCEs in PRB set p and carrier index $n_{CI}$ and $$\max_{n_{CI}}(M_{p,n_{CI}}^{(L)})$$

is the maximum value of $M_{p,n_{CI}}^{(L)}$ across the values of $n_{CI}$. In the above example, $$\max_{n_{CI}}(M_{p,n_{CI}}^{(L)}) = M_{p,0}^{(L)} = 6.$$

A simpler, but less optimal modification to Equation (3) is as in Equation (3B)

CCEs for PDCCH candidate $m_{n_{CI}}$ in PRB set p for carrier with index $n_{CI}$:

$$L \cdot \left\{ \left( Y_{p,k} + \left\lfloor \frac{m_{n_{CI}} \cdot N_{CCE,p,k}}{L \cdot M_{p,0}^{(L)}} \right\rfloor + n_{CI} \right) \bmod \left\lfloor \frac{N_{CCE,p,k}}{L} \right\rfloor \right\} + i \quad (3B)$$

Considering Equation (4), Equation (3A) can be simplified as in Equation (4A)

CCEs for PDCCH candidate m (same number of candidates for all carriers) in PRB set p for carrier with index $n_{CI}$:

$$L \cdot \left\{ \left( Y_{p,k} + \left\lfloor \frac{m \cdot N_{CCE,p,k}}{L \cdot M_p^{(L)}} \right\rfloor + n_{CI} \right) \bmod \left\lfloor \frac{N_{CCE,p,k}}{L} \right\rfloor \right\} + i \quad (4A)$$

A consequence of a deterministic assignment of PDCCH candidates to different carriers when there is no overlapping of respective CCEs among different PDCCH candidates is that a CIF field in respective DCI formats is not necessary as based on the location of a PDCCH candidate, UE 116 can determine a carrier a PDCCH corresponds to. However, in order to account for cases where PDCCH candidates for different carriers share same CCEs (this occurs when $$N_{CCE,p,k} < L \cdot \sum_{c=0}^{C-1} M_{p,c}^{(L)}),$$

a CIF field can be always present in DCI formats but it can be set to a predetermined value, such as for example a zero value, when $$N_{CCE,p,k} \geq L \cdot \sum_{c=0}^{C-1} M_{p,c}^{(L)}.$$

By using a predetermined value for a CIF field, the CIF field can serve as a virtual CRC to reduce a probability that UE 116 considers a DCI format intended for another UE, such as UE 115, as intended for the former UE (i.e., UE 116).

A determination by UE 116 of PDCCH candidates associated with C>1 active carriers can also be needed when different PDCCH PRB sets are used in a carrier to perform cross-carrier scheduling in each respective active carrier. For example, UE 116 configured with cross-carrier scheduling and with two PDCCH PRB sets in a first carrier may be indicated, by higher layer signaling or by specification, to associate a first PDCCH set with a first carrier and a second PDCCH set with a second carrier. The different PDCCH PRB sets can have different sizes as, for example, the C active carriers can have different bandwidths or support scheduling for different numbers of UEs per subframe. The PDCCH candidates corresponding to each carrier can be determined for each respective PDCCH set as described by Equation (1) with a PDCCH PRB set index directly associated with a carrier index. As different carriers can have different number of PDCCH candidates per CCE aggregation level for a given DCI format, CCEs corresponding to PDCCH candidate m can be obtained as CCEs for PDCCH candidate m in PRB set p:

$$L \cdot \left\{ \left( Y_{p,k} + \left\lfloor \frac{m \cdot N_{CCE,p,k}}{L \cdot M_{p,c}^{(L)}} \right\rfloor \right) \bmod \left\lfloor \frac{N_{CCE,p,k}}{L} \right\rfloor \right\} + i \quad (5)$$

where $M_{p,c}^{(L)}$ is a number of PDCCH candidates for aggregation level L CCEs in PRB set p for Mpg carrier c and the remaining notation is same as for Equation (1).

If the PDCCH sets do not have overlapping PRB pairs, a CIF field does not need to be included in a respective DCI format or its value can be set to a predetermined value, such as zero, as it was previously described. For example, for localized PDCCH candidates in a PRB of a PDCCH PRB set that is not common in another PDCCH PRB set for a same UE, the CIF field can be set to a zero value.

Figure 9:
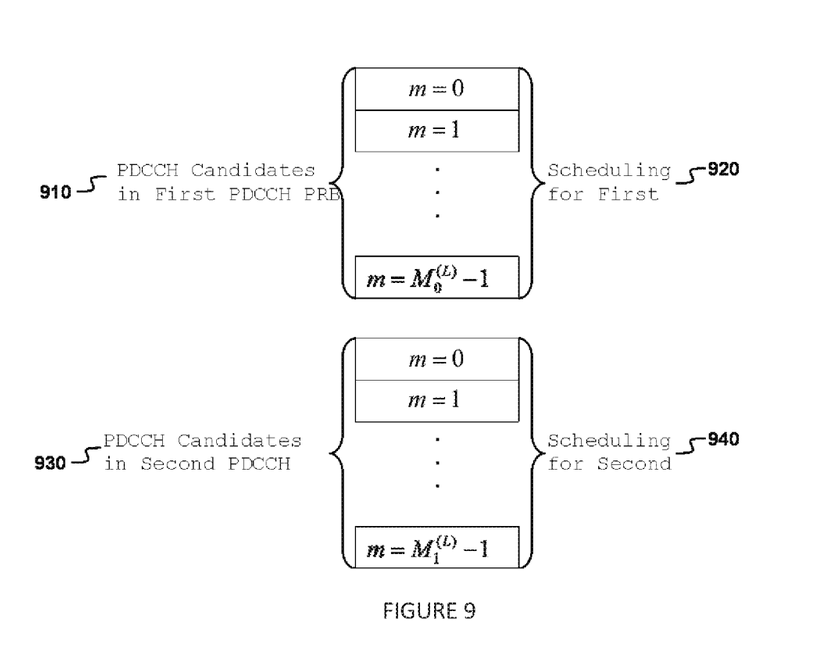
FIG. 9 illustrates an allocation of PDCCH candidates to different active carriers when respective transmissions are in different PDCCH PRB sets according to embodiments of the present disclosure.

FIG. 9 illustrates an allocation of PDCCH candidates to different active carriers when respective transmissions are in different PDCCH PRB sets according to embodiments of the present disclosure. The embodiment illustrated in FIG. 9 is for illustration only. Other embodiments of could be used without departing from the scope of this disclosure.

UE 116 has C=2 active carriers and, for CCE aggregation level L, $M_p^{(L)}$ PDCCH candidates in PDCCH PRB set p. UE 116 computes, according to Equation (1), a number of $M_0^{(L)}$-1 PDCCH candidates in a first PDCCH PRB set 910 where all PDCCH candidates are for scheduling in a first carrier 920 and a same number of $M_1^{(L)}$-1 PDCCH candidates in a second PDCCH PRB set 930, which can have a different size than the first PDCCH PRB set, where all PDCCH candidates are for scheduling in a second carrier 940. In case of multiple PDCCH PRB sets per carrier c, a number of PDCCH candidates in PDCCH PRB set p can be generalized as $M_{p,c}^{(L)}$.

Certain embodiments of the present disclosure can support spatial multiplexing of PDCCH transmissions from a same NodeB for scheduling in different carriers.

When a same PDCCH PRB set is used to support cross-carrier scheduling, a total number of CCEs in the PDCCH PRB set, $N_{CCE,p,k}$ can be smaller than a total number of CCEs required to support $M_p^{(L)}$ non-overlapping PDCCH candidates with aggregation level of L CCEs for C carriers, i.e. $N_{CCE,p,k}=C \cdot L \cdot M_p^{(L)}$. For example, for $N_{CCE,p,k}=16$, L=4, $M_p^{(L)}=4$, and C=2, there can be complete overlapping of PDCCH candidates for a first carrier with PDCCH candidates for a second carrier. Similar, for $N_{CCE,p,k}=32$, L=4, $M_p^{(L)}=6$, and C=2, there can be 33% overlapping of PDCCH candidates for a first carrier with PDCCH candidates for a second carrier. Increasing the number of PRBs per PDCCH PRB set or increasing the number of PDCCH PRB sets may not always be possible and it is always associated with additional overhead and possible bandwidth fragmentation.

For localized PDCCH, the collisions among CCEs corresponding to PDCCHs can be resolved by a NodeB applying orthogonal beamforming to respective PDCCH transmissions. This is a simple operation and does not rely on any feedback from a UE as the PDCCH transmissions are to a same UE from a same NodeB. As overlapping PDCCH transmissions to a same UE need to have orthogonal beamforming, at least for some or possibly all PDCCH transmissions a respective optimal beamforming is not used. However, this can be a network implementation issue and can be accommodated by other means such as for example using a somewhat increased transmission power, especially when a tradeoff is an increased spectral efficiency (for example, by a factor of 2). Moreover, perfect beamforming for an PDCCH transmission may not always be possible due to CSI measurement or quantization inaccuracies or because a PRB of an PDCCH transmission may not be one where optimal beamforming can apply.

In order to enable spatial multiplexing of PDCCH transmissions in a same PRB for scheduling in different component carriers, it is necessary to associate a different DMRS AP for each respective PDCCH transmission. This can be achieved by modifying the DMRS AP determination in Equation (2) to also include a carrier index $n_{CI}$. For example, in case of cross-carrier scheduling in a same PDCCH PRB set, a DMRS AP $u=0, \ldots, U-1$, where U is a total number of DMRS APs, for carrier with index no can be determined as in Equation (6)

$$u = n_{CCE,init} \bmod N_{CCE,k}^{PRB} + (RNTI + n_{CI}) \cdot \bmod \min (N_{CCE,k}^{PRB}, L) \quad (6)$$

In Equation (6), all notations are as in Equation (2) and no is a carrier index. For example, for $n_{CE,init}=0$, $N_{CCE,k}^{PRB}=4$, L=4, and a UE RNTI that is a multiple of four, an PDCCH transmission intended for carrier with $n_{CI}=0$ uses DMRS AP u=0 while an PDCCH transmission intended for carrier with $n_{CI}=1$ uses DMRS AP u=1 (instead of u=0 in case a carrier index was not included in a determination of a DMRS AP).

Figure 10:
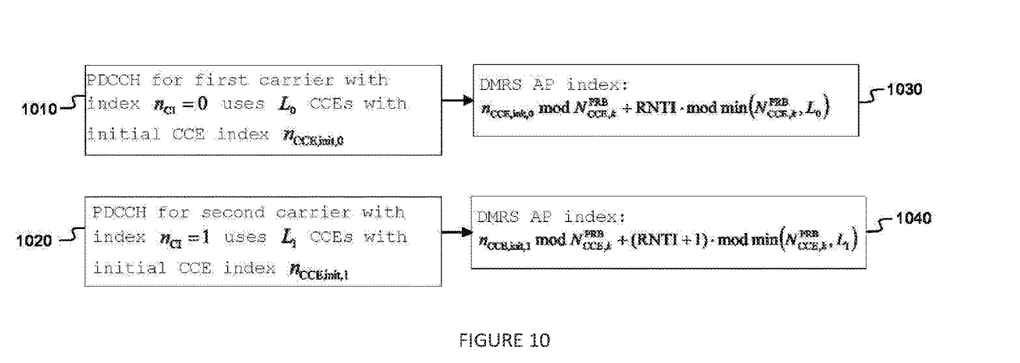
FIG. 10 illustrates an allocation of DMRS APs to a first PDCCH transmission providing a scheduling assignment for a first carrier and to a second PDCCH transmission providing a scheduling assignment for a second carrier according to embodiments of the present disclosure.

FIG. 10 illustrates an allocation of DMRS APs to a first PDCCH transmission providing a scheduling assignment for a first carrier and to a second PDCCH transmission providing a scheduling assignment for a second carrier according to embodiments of the present disclosure. The embodiment illustrated in FIG. 10 is for illustration only. Other embodiments of could be used without departing from the scope of this disclosure.

A first PDCCH providing a scheduling assignment for a first carrier with index $n_{CI}=0$ is transmitted to UE 116 having a RNTI using an aggregation level of $L_0$ CCEs with an initial CCE having an index $n_{CCE,init,0}$ in a first PRB having $N_{CCE,k}^{PRB}$ CCEs and being included in a PDCCH PRB set 1010. A second PDCCH providing a scheduling assignment for a second carrier with index $n_{CI}=1$ is transmitted to UE 116 using an aggregation level of $L_1$ CCEs with an initial CCE having an index $n_{CCE,init,1}$ in a second PRB having $N_{CCE,k}^{PRB}$ CCEs and being included in the PDCCH PRB set 1020. For a demodulation of control information in the first PDCCH, UE 116 obtains a channel estimate using a DMRS AP with index u derived as $u = n_{CCE,init,0} \bmod N_{CCE,k}^{PRB} +$ RNTI·mod min($N_{CCE,k}^{PRB}$, $L_0$) 1030. For a demodulation of control information in the second PDCCH, UE 116 obtains a channel estimate using a DMRS AP with index u derived as $u = n_{CCE,init,1} \bmod N_{CCE,k}^{PRB} + (RNTI+1) \cdot \bmod \min(N_{CCE,k}^{PRB}, L_1)$ 1040.

Certain embodiments of the present disclosure determine a parameter $Y_{p,k}$ for a UE that randomizes an initial CCE for a first PDCCH candidate in PDCCH PRB set p and subframe k.

An objective of having the parameter $Y_{p,k}$ in the determination of CCEs used by PDCCH candidates as in Equation (1) depend on a PDCCH PRB set index p is to avoid an overlapping of CCEs for PDCCH candidates between two UEs in a first PDCCH PRB set from also occurring in a second PDCCH PRB set in a same subframe. However, a location of such CCEs also depends on the PRB set size as determined by the term $$\mod \left\lfloor \frac{N_{CCE,p,k}}{L} \right\rfloor$$

in Equation (1). Therefore, if the PDCCH PRB sets have different sizes, resulting to different value of a total number of CCEs $N_{CCE,p,k}$ using a different $Y_{p,k}$ in such respective different sets can actually be detrimental in avoiding an overlapping of CCEs for different UE that occurs in a first PDCCH PRB set from occurring in a second PDCCH PRB set as due to the different value of $$\mod \left\lfloor \frac{N_{CCE,p,k}}{L} \right\rfloor$$

in the two PDCCH PRB sets, an overlapping would not occur if $Y_{p,k}$ is same but may occur if $Y_{p,k}$ is additionally changed.

Based on the above, a value of $Y_{p,k}$ different PDCCH PRB sets in a same subframe k remains same if these sets have different sizes (different numbers of PRBs) and changes only if these sets have different sizes. Therefore, if $Y_{0,k}$ is a value in PDCCH PRB set p=0 and $Y_{p,k}$ is a value in PDCCH PRB set p>0 having same size with PDCCH PRB set p=0, $Y_{l,k}$ can be determined in general as in Equation (7)

$$Y_{p,k} = S \cdot Y_{p,k} + (1-S) \cdot Y_{0,k} \quad (7)$$

where S=1 if $N_{CCE,0,k} = N_{CCE,p,k}$ S=0 otherwise ($N_{CCE,0,k} \neq N_{CCE,p,k}$). The condition $N_{CCE,0,k} = N_{CCE,p,k}$ is equivalent to the condition that a number of PRBs in PDCCH PRB set p=0 is the same as in PDCCH PRB set p>0.

For $Y_{p,k} = (A_p \cdot Y_{p,k-1}) \bmod D_p$, if $Y_{p,k}$ is obtained from $Y_{0,k}$ by adding a term to a respective component Q, such as for example $Y_{p,-1} = Y_{0,-1} + f_Y(p)$ or $A_0 + f_A(p)$ with $f_Y(p)$ or $f_A(p)$ either having predetermined values or being functions of a set index p>0, then by denoting the component of $Y_{0,k}$ as $Q_0$ (e.g. $Q_0 = Y_{0,-1}$ or $Q_0 = A_0$) and the component of $Y_{p,k}$ as $Q_p$ (e.g. $Q_p = Y_{p,-1}$ or $Q_p = A_p$), Equation (7) can be expressed as Equation (8)

$$Q_p = Q_0 + \left\lfloor \frac{\min(N_{CCE,0,k}, N_{CCE,p,k})}{\max(N_{CCE,0,k}, N_{CCE,p,k})} \right\rfloor \cdot f_Q(p) \quad (8)$$

where if PDCCH PRB set p>0 has a same size as PDCCH PRB set p=0, $Q_p = Q_0 + f_Q(p)$; otherwise, $Q_p = Q_0$. In case PDCCH PRB set p=0 is indexed so that it always has a larger than or equal size than any other PDCCH PRB set configured to a UE, Equation (8) can be simplified as $$Q_p = Q_0 + \left\lfloor \frac{N_{CCE,p,k}}{N_{CCE,0,k}} \right\rfloor \cdot f_Q(p).$$

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for assigning control channel elements (CCEs) to a transmission of a physical downlink control channel (PDCCH) candidate, the method comprising:

determining a location for L CCEs corresponding to a PDCCH candidate $m_{n_{CI}}$ in a search space for a serving cell corresponding to a carrier indicator $n_{CI}$; and transmitting the PDCCH candidate $m_{n_{CI}}$ based on the location of the L CCEs, wherein:

the location of the L CCEs is determined by $$L \cdot \left\{ \left( Y_{p,k} + \left\lfloor \frac{m_{n_{CI}} \cdot N_{CCE,p,k}}{L \cdot \max_{n_{CI}}(M^{(L)}_{p,n_{CI}})} \right\rfloor + n_{CI} \right) \bmod \left\lfloor \frac{N_{CCE,p,k}}{L} \right\rfloor \right\} + i,$$

and where $N_{CCE,p,k}$ is a total number of CCEs in a resource set p at a time unit k, $Y_{p,k}$ is an offset calculated based on the resource set p at the time unit k, i=0, ..., L-1, m=0, ..., $M^{(L)}_{p,n_{CI}}-1$, $M^{(L)}_{p,n_{CI}}$ is a number of PDCCH candidates for CCE aggregation level L in the resource set p for the serving sell corresponding to the carrier indicator $n_{CI}$, and $$\max_{n_{CI}}(M^{(L)}_{p,n_{CI}})$$

is the maximum of $M^{(L)}_{p,n_{CI}}$ across the values of $n_{CI}$.

2. The method of claim 1, further comprising: transmitting the number of PDCCH candidates $M^{(L)}_{p,n_{CI}}$ by higher layer signaling.

3. The method of claim 1, wherein the PDCCH candidate $m_{n_{CI}}$ is transmitted on the serving cell with index $n_{CI}=0$.

4. The method of claim 1, wherein:
the PDCCH candidate $m_{n_{CI}}$ includes a downlink control information (DCI) format, and
the DCI format schedules either a transmission of a physical downlink shared channel (PDSCH) or a reception of a physical uplink shared channel (PUSCH).

5. The method of claim 4, wherein $Y_{p,k}=(A_p \cdot Y_{p,k-1}) \bmod D$, $A_p$ is a predetermined value corresponding to the resource set p, D=65537, $Y_{p,k-1}=n_{RNTI}$, and $n_{RNTI}$ is a radio network temporary identifier (RNTI) associated with the DCI format.

6. A method for assigning control channel elements (CCEs) to a reception of a physical downlink control channel, PDCCH, the method comprising:

determining a location for L CCEs corresponding to a PDCCH candidate $m_{n_{CI}}$ of a search space for a serving cell corresponding to a carrier indicator $n_{CI}$; and receiving the PDCCH candidate $m_{n_{CI}}$ based on the location of the L CCEs, wherein the location of the L CCEs is determined by $$L \cdot \left\{ \left( Y_{p,k} + \left\lfloor \frac{m_{n_{CI}} \cdot N_{CCE,p,k}}{L \cdot \max_{n_{CI}}(M^{(L)}_{p,n_{CI}})} \right\rfloor + n_{CI} \right) \bmod \left\lfloor \frac{N_{CCE,p,k}}{L} \right\rfloor \right\} + i,$$

and where $N_{CCE,p,k}$ is a total number of CCEs in a resource set p at a time unit k, $Y_{p,k}$ is an offset calculated based on the resource set p at the time unit k, i=0, ..., L-1, m=0, ..., $M^{(L)}_{p,n_{CI}}-1$, $M^{(L)}_{p,n_{CI}}$ is a number of PDCCH candidates for CCE aggregation level L in the resource set p for the serving sell corresponding to the carrier indicator $n_{CI}$, and $$\max_{n_{CI}}(M^{(L)}_{p,n_{CI}})$$

is the maximum of $M^{(L)}_{p,n_{CI}}$ across the values of $n_{CI}$.

7. The method of claim 6, further comprising:
receiving the number of PDCCH candidates $M^{(L)}_{p,n_{CI}}$ by higher layer signaling.

8. The method of claim 6, wherein the POOCH candidate $m_{n_{CI}}$ is received on the serving cell with index $n_{CI}=0$.

9. The method of claim 6, wherein: the PDCCH candidate $m_{n_{CI}}$ includes a downlink control information (DCI) format, and the DCI format schedules either a reception of a physical downlink shared channel (PDSCH) or a transmission of a physical uplink shared channel (PUSCH).

10. The method of claim 8, wherein $Y_{p,k}=(A_p \cdot Y_{p,k-1}) \bmod D$, $A_p$ is a predetermined value corresponding to the resource set p, D=65537, $Y_{p,k-1}=n_{RNTI}$, and $n_{RNTI}$ is a radio network temporary identifier (RNTI) associated with the DCI format.

11. A base station configured to assign control channel elements (CCEs) to a transmission of a physical downlink control channel (POOCH) candidate, the base station comprising:

a processor configured to determine a location for L CCEs corresponding to a PDCCH candidate $m_{n_{CI}}$ in a search space for a serving cell corresponding to a carrier indicator $n_{CI}$; and a transmitter operably connected to the processor, the transmitter configured to transmit the POOCH candidate $m_{n_{CI}}$ based on the location of the L CCEs, wherein:

the location of the L CCEs is determined by $$L \cdot \left\{ \left( Y_{p,k} + \left\lfloor \frac{m_{n_{CI}} \cdot N_{CCE,p,k}}{L \cdot \max_{n_{CI}}(M^{(L)}_{p,n_{CI}})} \right\rfloor + n_{CI} \right) \bmod \left\lfloor \frac{N_{CCE,p,k}}{L} \right\rfloor \right\} + i,$$

and where $N_{CCE,p,k}$ is a total number of CCEs in a resource set p at a time unit k, $Y_{p,k}$ is an offset calculated based on the resource set p at the time unit k, i=0, ..., L-1, m=0, ..., $M^{(L)}_{p,n_{CI}}-1$, $M^{(L)}_{p,n_{CI}}$ is a number of PDCCH candidates for CCE aggregation level L in the resource set p for the serving sell corresponding to the carrier indicator $n_{CI}$, and $$\max_{n_{CI}}(M^{(L)}_{p,n_{CI}})$$

is the maximum of $M^{(L)}_{p,n_{CI}}$ across the values of $n_{CI}$.

12. The base station of claim 11, wherein the transmitter is further configured to transmit the number of PDCCH candidates $M^{(L)}_{p,n_{CI}}$ by higher layer signaling.

13. The base station of claim 11, wherein the PDCCH candidate $m_{n_{CI}}$ is transmitted on the serving cell with index $n_{CI}=0$.

14. The base station of claim 11, wherein:
the PDCCH candidate $m_{n_{CI}}$ includes a downlink control information (DCI) format, and
the DCI format schedules either a transmission of a physical downlink shared channel (PDSCH) or a reception of a physical uplink shared channel (PUSCH).

15. The base station of claim 14, wherein $Y_{p,k}=(A_p \cdot Y_{p,k-1}) \bmod D$, $A_p$ is a predetermined value corresponding to the resource set p, D=65537, $Y_{p,k-1}=n_{RNTI}$, and $n_{RNTI}$ is a radio network temporary identifier (RNTI) associated with the DCI format.

16. A user equipment (UE) configured to assign control channel elements (CCEs) to a reception of a physical downlink control channel (POOCH) candidate, the UE comprising:
- a processor configured to determine a location for L CCEs corresponding to a PDCCH candidate $m_{n_{CI}}$ in a search space for a serving cell corresponding to a carrier indicator $n_{CI}$; and
- a receiver operably connected to the processor, the receiver configured to receive the PDCCH candidate $m_{n_{CI}}$ based on the location of the L CCEs, wherein:

the location of the L CCEs is determined by $$L \cdot \left\{ \left( Y_{p,k} + \left\lfloor \frac{m_{n_{CI}} \cdot N_{CCE,p,k}}{L \cdot \max_{n_{CI}}(M_{p,n_{CI}}^{(L)})} \right\rfloor + n_{CI} \right) \bmod \left\lfloor \frac{N_{CCE,p,k}}{L} \right\rfloor \right\} + i,$$

where $N_{CCE,p,k}$ is a total number of CCEs in a resource set p at a time unit k, $Y_{p,k}$ is an offset calculated based on the resource set p at the time unit k, i=0, ..., L-1, m=0, ..., $M_{p,n_{CI}}^{(L)}-1$, $M_{p,n_{CI}}^{(L)}$ is a number of PDCCH candidates for CCE aggregation level L in the resource set p for the serving sell corresponding to the carrier indicator $n_{CI}$, and $$\max_{n_{CI}}(M_{p,n_{CI}}^{(L)})$$

is the maximum of $M_{p,n_{CI}}^{(L)}$ across the values of $n_{CI}$.

17. The UE of claim 16, wherein the receiver is further configured to receive the number of PDCCH candidates $M_{p,n_{CI}}^{(L)}$ higher layer signaling.

18. The UE of claim 16, wherein the POOCH candidate $m_{n_{CI}}$ is transmitted on the serving cell with index $n_{CI}=1$.

19. The UE of claim 16, wherein:
- the PDCCH candidate $m_{n_{CI}}$ includes a downlink control information (DCI) format, and
- the DCI format schedules either a reception of a physical downlink shared channel (PDSCH) or a transmission of a physical uplink shared channel (PUSCH).

20. The UE of claim 19, wherein $Y_{p,k}=(A_p \cdot Y_{p,k-1}) \bmod D$, $A_p$ is a predetermined value corresponding to the resource set p, D=65537, $Y_{p,k-1}=n_{RNTI}$, and $n_{RNTI}$ is a radio network temporary identifier (RNTI) associated with the DCI format.

* * * * *